United States Patent
Joseph et al.

(10) Patent No.: US 10,586,432 B2
(45) Date of Patent: Mar. 10, 2020

(54) SYSTEMS AND METHODS FOR INTRUSION DETECTION USING SELECTIVE MASKING

(71) Applicant: Honeywell International Inc., Morristown, NJ (US)

(72) Inventors: Vibgy Joseph, Tirunelveli (IN); Sakthi Prakash Marakkannu, Madurai (IN); Balaji Bhathey Sivakumar, Madurai (IN)

(73) Assignee: ADEMCO INC., Golden Valley, MN (US)

( * ) Notice: Subject to any disclaimer, the term of this patent is extended or adjusted under 35 U.S.C. 154(b) by 131 days.

(21) Appl. No.: 15/858,046

(22) Filed: Dec. 29, 2017

(65) Prior Publication Data

US 2019/0206208 A1   Jul. 4, 2019

(51) Int. Cl.
| G08B 13/196 | (2006.01) |
| G08B 13/00 | (2006.01) |
| G07C 9/00 | (2020.01) |
| G06T 7/70 | (2017.01) |
| H04N 7/18 | (2006.01) |

(52) U.S. Cl.
CPC ............ *G08B 13/196* (2013.01); *G06T 7/70* (2017.01); *G07C 9/00007* (2013.01); *G07C 9/00111* (2013.01); *G08B 13/00* (2013.01); *H04N 7/185* (2013.01); *G06T 2207/30196* (2013.01); *G06T 2207/30242* (2013.01)

(58) Field of Classification Search
CPC .............. G08B 13/196; G06T 7/70; G06T 2207/30196; G06T 2207/30242; H04N 7/185
USPC .................................................. 348/152
See application file for complete search history.

(56) References Cited

U.S. PATENT DOCUMENTS

| 5,305,390 A * | 4/1994 | Frey .................... G06Q 10/06 382/115 |
| 6,400,265 B1 | 6/2002 | Saylor et al. |
| 7,382,244 B1 * | 6/2008 | Donovan ......... G08B 13/19645 340/506 |

(Continued)

FOREIGN PATENT DOCUMENTS

| CN | 101687609 B | 5/2012 |
| JP | 2013109779 A * | 6/2013 |
| WO | 03/088157 A1 | 10/2003 |

OTHER PUBLICATIONS

English language translation of bibliographic data and abstract for CN101687609 (A).

(Continued)

*Primary Examiner* — William C Vaughn, Jr.
*Assistant Examiner* — Jae N Noh
(74) *Attorney, Agent, or Firm* — Husch Blackwell LLP

(57) ABSTRACT

Systems and methods for intrusion detection using selective masking are provided. Some methods can include receiving a first signal from an intrusion detection system indicative of a first number of individuals within a zone of a secured area, receiving a second signal from an access control system indicative of a second number of authorized persons within the secured area, receiving a third signal from an internal positioning system indicative of a respective location of each of the authorized persons within the secured area, and correlating the first signal, the second signal, and the third signal to determine whether an unauthorized person is within the zone.

16 Claims, 2 Drawing Sheets

(56) References Cited

U.S. PATENT DOCUMENTS

| | | | |
|---|---|---|---|
| 2002/0093425 A1* | 7/2002 | Puchek | G06K 9/00973 |
| | | | 340/540 |
| 2007/0001835 A1 | 1/2007 | Ward et al. | |
| 2012/0286929 A1 | 11/2012 | Kline | |
| 2015/0287301 A1 | 10/2015 | Locke | |
| 2016/0284183 A1 | 9/2016 | Trani | |
| 2018/0012434 A1* | 1/2018 | Power | E05B 19/0005 |
| 2019/0012607 A1* | 1/2019 | Holliday | G06N 7/005 |

OTHER PUBLICATIONS

English language translation of abstract, description, and claims for CN101687609A.

Extended European search report from corresponding EP patent application 18198110.1, dated Jul. 25, 2019.

* cited by examiner

SYSTEMS AND METHODS FOR INTRUSION DETECTION USING SELECTIVE MASKING

FIELD

The present invention relates to intrusion detection. More particularly, the present invention relates to systems and methods for intrusion detection using selective masking.

BACKGROUND

Known intrusion detection systems include a plurality of sensors in a plurality of zones to protect a secured area. When an authorized person enters the secured area, each of the plurality of zones in the secured area is disarmed. However, an unauthorized person may intrude the secured area by tailgating the authorized person into the secured area without the knowledge of the authorized person. Unfortunately, known intrusion detection systems will not detect a presence of the unauthorized person and identify an alarm state responsive thereto because the secured area is disarmed responsive to the entrance of the authorized person. Accordingly, known intrusion detection systems will not notify the authorized person about the potential threat of the unauthorized person. Furthermore, the authorized person may ignore the unauthorized person in the secured area because the authorized person may incorrectly assume that the unauthorized person is authorized to be in the secured area.

In view of the above, there is a continuing, ongoing need for improved systems and methods.

DETAILED DESCRIPTION

Figure 1:
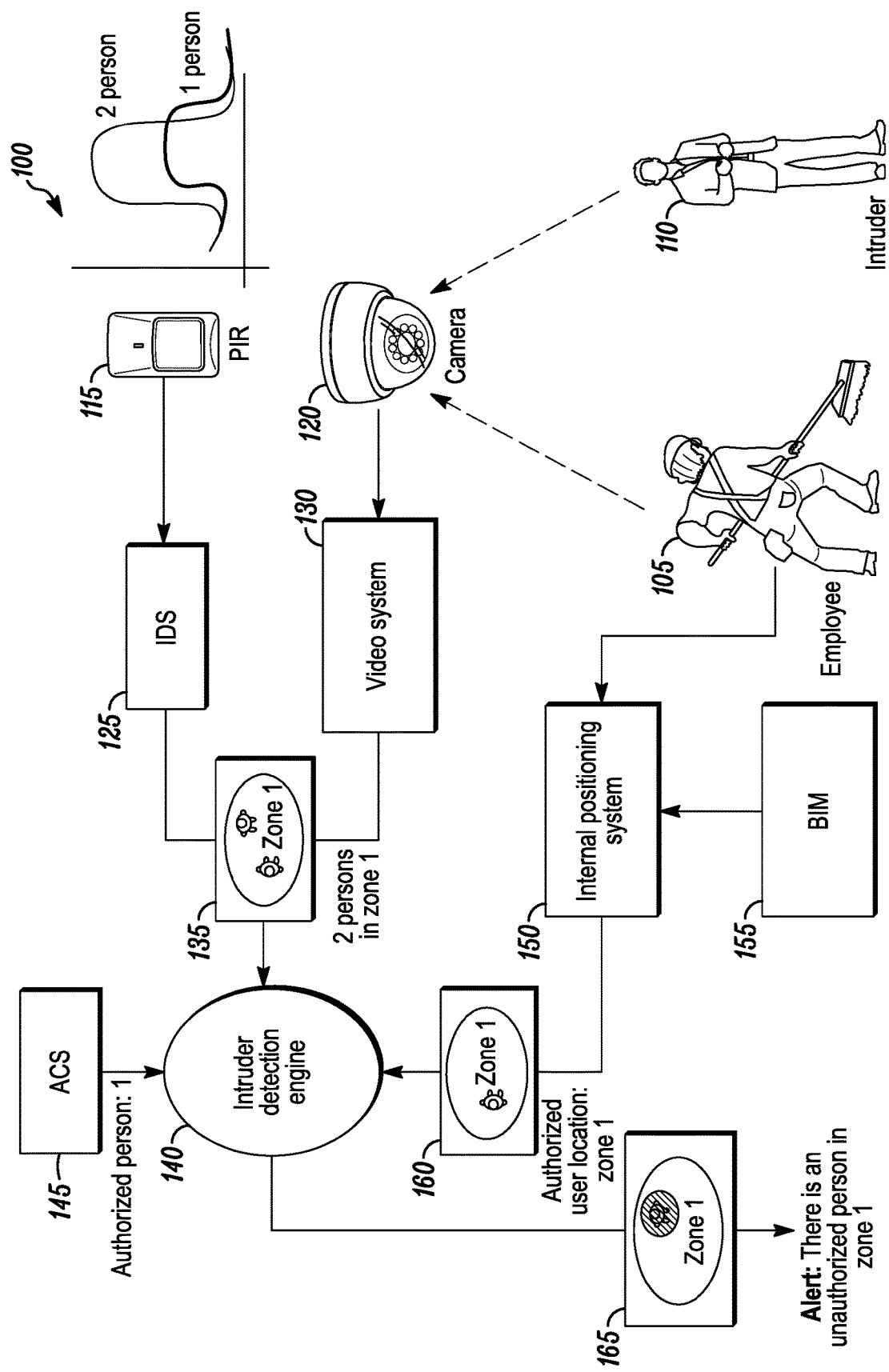
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for intrusion detection using selective masking. For example, systems and methods disclosed herein can integrate some or all of an intruder detector engine, an intrusion detection system, an access control system, a video management system, an internal positioning system, and a building information model of a secured area to identify an unauthorized person within the secured area. In some embodiments, the intrusion detection system can always be in an armed state, and in some embodiments, a specific region inside of a zone of a secured area, such as an office, a stage area, a hospital, or the like, can be selectively masked when an authorized person enters the zone to assist in identifying the unauthorized person within the zone.

In accordance with disclosed embodiments, when a zone device sensor in the zone, such as a PIR device or a camera, is activated, the intrusion detection system or the video management system can process a first signal from the zone device sensor to determine a number of persons identified within the zone and within range of the zone device sensor and can transmit a second signal identifying the number of persons identified to the intruder detection engine. In some embodiments, the intruder detection engine can also access the building information model of the secured area to identify a location of each of the persons identified within the zone. In this manner, systems and methods disclosed herein can increase detection resolution of the persons identified within the zone.

Substantially simultaneously or responsive to the second signal, the intruder detection engine can receive a third signal from the access control system identifying the number of authorized persons within the zone or within the secured area and can receive a fourth signal from the internal positioning system identifying the location of each of the authorized persons within the zone or within the secured area. Then, the intruder detection engine can correlate the second signal from the intrusion detection system or the video management system identifying the number of persons identified within the zone, the third signal from the access control system identifying the number of authorized persons within the zone or within the secured area, and the fourth signal from the internal positioning system identifying the location of each of the authorized persons within the zone or within the secured area to determine whether the unauthorized person is within the zone.

In some embodiments, when the intruder detection engine determines that the unauthorized person is within the zone, the intruder detection engine can transmit a notification signal to a remote user or to the authorized person in the zone to provide a warning of the risk of the unauthorized person.

In some embodiments, systems and methods disclosed herein can identify and save data identifying when and where the unauthorized person is detected within the zone or within the secured area and use such saved data for future forensic analysis, such as identifying a path that the unauthorized person traversed within the secured area.

In some embodiments, the zone device sensor can include the PIR device. In these embodiments, the intrusion detection system can use signal strength of the first signal received from the PIR device to determine the number of persons within the zone and within the range of the PIR device. For example, an infrared signal received by the PIR device can be different for different numbers of persons within the range of the PIR device. Therefore, the infrared signal can be used to estimate the number of persons within the range of the PIR device.

In some embodiments, the zone device sensor can include the camera. In these embodiments, the video management system can use video analytics to determine the number of persons within the zone and within the range of the camera. For example, the video management system can count heads or occupancy of the persons identified in an image captured by the camera to determine the number of person within the range of the camera. In some embodiments, the video management system can also use the video analytics to determine the location of each of the persons identified within the range of the camera.

In some embodiments, the zone device sensor can include both the PIR device and the camera. In these embodiments, the intrusion detection system can process one first signal from the PIR device to estimate the number of persons identified within the zone and within the range of the PIR device, the video management system can process another first signal from the camera to estimate the number of persons identified within the zone and within range of the camera, and the intruder detection engine can receive and combine second signals from both the intrusion detection system and the video management system to more accurately identify the number of persons within the zone.

In some embodiments, the authorized person can wear or carry a smart device. The internal positioning system can receive a beacon signal from the smart device and access the building information model of the secured area to identify the location of the authorized person within the zone of the secured area, for example, using Wi-Fi triangulation or the like. In this manner, systems and methods disclosed herein can increase the detection resolution of the authorized person within the zone. Then, systems and methods disclosed herein can selectively mask a specific region immediately surrounding the location of the authorized person to determine whether the unauthorized person is within the zone. That is, systems and methods disclosed herein can selectively ignore the authorized person and the specific region immediately proximate thereto to determine whether any other person is within the zone and, if so, determine that the unauthorized person is within the zone.

Figure 2A:
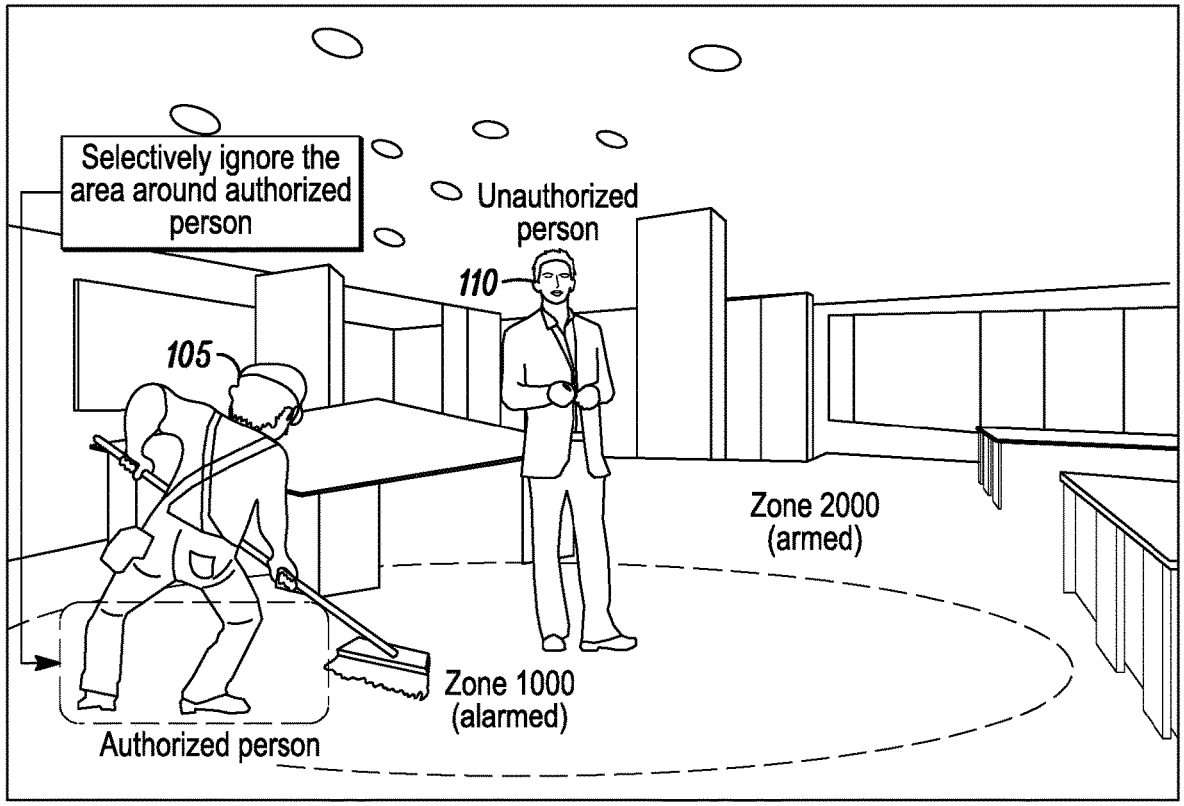
FIG. 2A is an illustration of an authorized person and an unauthorized person in a zone of a secured area.
Figure 2B:
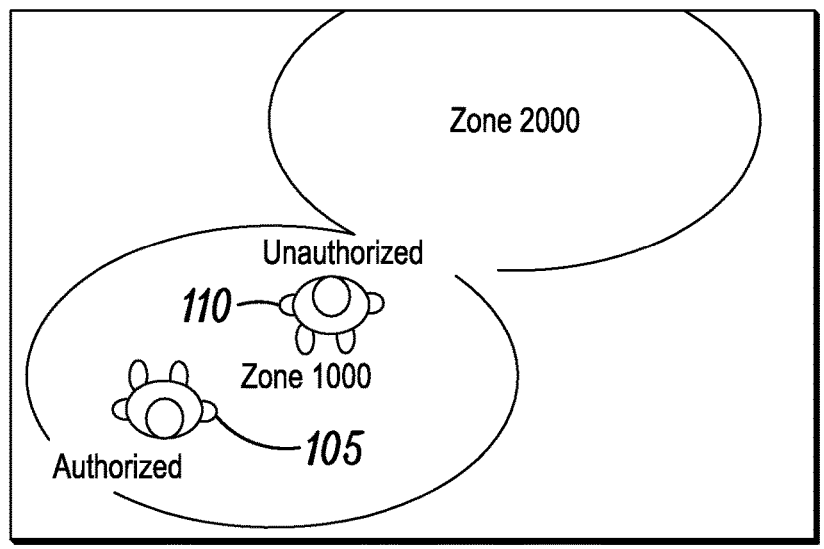
FIG. 2B is a top view of an authorized person and an unauthorized person in a zone of a secured area.

FIG. 1 is a block diagram of a system 100 in accordance with disclosed embodiments. Furthermore, FIG. 2A is an illustration of the authorized person 105 and the unauthorized person 110 in the zone 1000 of the secured area, and FIG. 2B is a top view of the authorized person 105 and the unauthorized 110 person in the zone 1000 of the secured area.

As seen in the figures, when the unauthorized person 110 enters the zone 1000 by tailgating the authorized person 105 into the zone 1000, the PIR device 115 or the camera 120 can be activated responsive to detecting the authorized person 105 and the unauthorized person 106, and the intrusion detection system 125 or the video management system 130 can process the first signal from the PIR device 115 or the camera 120 to determine the number of persons identified within the zone 1000 and transmit the second signal 135 to the intruder detection engine 140 to identify that two persons are in the zone 1000. Substantially simultaneously or responsive to the second signal 135, the intruder detection engine 140 can receive the third signal from the access control system 145 to identify one authorized person being in the zone 1000 and can receive the fourth signal 160 from the internal positioning system 150, which can access the building information model 155 to identify the location of the authorized person 105 in the zone 1000. Then, the intruder detection engine 140 can correlate the second signal 135 from the intrusion detection system 125 or the video management system 130 identifying two persons being the zone 1000, the third signal from the access control system 145 identifying one authorized person being in the zone 1000, and the fourth signal 160 from the internal positioning system 160 identifying the location of the authorized person 150 in the zone 1000 to selectively ignore a specific region immediately surrounding the authorized person 105 by masking the authorized person 105, to determine that the unauthorized person 110 is within the zone 100, to enter an alarm state, and responsive thereto, to transmit the notification signal 165. For example, in some embodiments, the intruder detection engine 140 can transmit the notification signal to the authorized person 105 or to other authorized persons to alert all of the authorized persons within the secured area of the potential threat of the unauthorized person 110 and to instruct all of the authorized persons to move towards safety.

It is to be understood that each of the intruder detector engine, the intrusion detection system, the access control system, the video management system, and the internal positioning system can include a respective transceiver device, a respective memory device storing the building information model, and a respective user interface device each of which can be in communication with respective control circuitry, a respective programmable processor, and respective executable control software as would be understood by one of ordinary skill in the art. The respective executable control software can be stored on a transitory or non-transitory computer readable medium, including, but not limited to local computer memory, RAM, optical storage media, magnetic storage media, flash memory, and the like. In some embodiments, the respective control circuitry, the respective programmable processor, and the respective executable control software can execute and control some or all of the methods disclosed herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    receiving a first signal from an intrusion detection system indicative of a first number of individuals within a zone of a secured area;
    receiving a second signal from an access control system indicative of a second number of authorized persons within the secured area;
    receiving a third signal from an internal positioning system indicative of a respective location of each of the authorized persons within the secured area, wherein the third signal identifies the respective location of each of the authorized persons within the zone;
    using the first signal, the second signal, and the third signal to selectively mask and ignore a respective region immediately surrounding each of the authorized persons within the zone; and
    correlating the first signal, the second signal, and the third signal to determine whether an unauthorized person is within the zone.

2. The method of claim 1 wherein the second signal is based on the second number of the authorized persons the access control system counts entering the zone.

3. The method of claim 2 further comprising determining that the unauthorized person is within the zone when the first number of the individuals within the zone is greater than the second number of the authorized persons within the zone.

4. The method of claim 1 further comprising determining that the unauthorized person is within the zone when at least one of the first number of the individuals is identified after the respective region immediately surrounding each of the authorized persons within the zone is masked and ignored.

5. The method of claim 1 further comprising transmitting a notification signal to each of the authorized persons or to a remote user to provide an alert of the unauthorized person.

6. The method of claim 1 wherein the first signal is indicative of signal strength of an infrared signal received by a PIR device.

7. The method of claim 1 wherein the first signal is based on the first number of the individuals counted in an image of the zone captured by a camera.

8. The method of claim 1 wherein the third signal is based on a respective beacon signal received from a respective smart device carried by each of the authorized persons.

9. A system comprising:
a transceiver device;
a programmable processor; and
executable control software stored on a non-transitory computer readable medium,
wherein the transceiver device receives a first signal from an intrusion detection system indicative of a first number of individuals within a zone of a secured area,
wherein the transceiver device receives a second signal from an access control system indicative of a second number of authorized persons within the secured area,
wherein the transceiver device receives a third signal from an internal positioning system indicative of a respective location of each of the authorized persons within the secured area,
wherein the third signal identifies the respective location of each of the authorized persons within the zone,
wherein the programmable processor and the executable control software use the first signal, the second signal, and the third signal to selectively mask and ignore a respective region immediately surrounding each of the authorized persons within the zone, and
wherein the programmable processor and the executable control software correlate the first signal, the second signal, and the third signal to determine whether an unauthorized person is within the zone.

10. The system of claim 9 wherein the second signal is based on the second number of the authorized persons the access control system counts entering the zone.

11. The system of claim 10 wherein the programmable processor and the executable control software determine that the unauthorized person is within the zone when the first number of the individuals within the zone is greater than the second number of the authorized persons within the zone.

12. The system of claim 9 wherein the programmable processor and the executable control software determine that the unauthorized person is within the zone when at least one of the first number of the individuals is identified after the respective region immediately surrounding each of the authorized persons within the zone is masked and ignored.

13. The system of claim 9 wherein the transceiver transmits a notification signal to each of the authorized persons or to a remote user to provide an alert of the unauthorized person.

14. The system of claim 9 wherein the first signal is indicative of signal strength of an infrared signal received by a PIR device.

15. The system of claim 9 wherein the first signal is based on the first number of the individuals counted in an image of the zone captured by a camera.

16. The system of claim 9 wherein the third signal is based on a respective beacon signal received from a respective smart device carried by each of the authorized persons.

* * * * *